US008156266B2

(12) United States Patent  
Agnihotri et al.

(10) Patent No.: US 8,156,266 B2  
(45) Date of Patent: *Apr. 10, 2012

(54) CONSUMER ELECTRONICS CONTROL (CEC) LINE ENHANCEMENT METHOD FOR HDMI NETWORK THAT SELECTS A TRANSFER RATE FROM A PLURALITY OF TRANSFER RATES

(75) Inventors: Davender Agnihotri, Murrieta, CA (US); Lee Pedlow, Ramona, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/889,269

(22) Filed: Sep. 23, 2010

(65) Prior Publication Data

US 2011/0016424 A1    Jan. 20, 2011

Related U.S. Application Data

(63) Continuation of application No. 11/875,792, filed on Oct. 19, 2007, now Pat. No. 7,861,017.

(51) Int. Cl.  
*G06F 15/16* (2006.01)

(52) U.S. Cl. ........... 710/60; 710/8; 710/38; 709/233; 375/220; 375/252; 375/342; 348/512; 348/515

(58) Field of Classification Search .......... 710/8, 38, 710/60; 375/220, 252; 348/512, 515  
See application file for complete search history.

(56) References Cited

U.S. PATENT DOCUMENTS

| | | | |
|---|---|---|---|
| 5,490,209 | A | 2/1996 | Kennedy et al. |
| 5,627,858 | A | 5/1997 | Mak et al. |
| 7,006,561 | B2 | 2/2006 | Lee |
| 7,562,379 | B2 | 7/2009 | Hardacker et al. |
| 7,590,188 | B2 | 9/2009 | Giannakis et al. |
| 2005/0030808 | A1 | 2/2005 | Brown et al. |
| 2005/0094570 | A1 | 5/2005 | Berthy |
| 2006/0209880 | A1 | 9/2006 | Chang et al. |
| 2006/0209890 | A1 | 9/2006 | MacMullan et al. |
| 2006/0209892 | A1 | 9/2006 | MacMullen et al. |

(Continued)

FOREIGN PATENT DOCUMENTS

EP     1684518     7/2006

(Continued)

OTHER PUBLICATIONS

European Search Report from the European Patent Office for App. No. 088390182 dated Dec. 29, 2010.

(Continued)

*Primary Examiner* — Tammara Peyton  
(74) *Attorney, Agent, or Firm* — Fitch, Even, Tabin & Flannery, LLP (57) ABSTRACT

A method for determining transfer rate comprising selecting a first transfer rate of a plurality of transfer rates, transmitting a message at the first transfer rate over a Consumer Electronics Control (CEC) line of a High Definition Multimedia Interface (HDMI) network, determining whether an acknowledgment to the message having been transmitted at the first transfer rate is received, storing, in the event the acknowledgment to the message having been transmitted at the first transfer rate is received, the first transfer rate and storing, in the event no acknowledgment is received, a default transfer rate of the plurality of transfer rates.

14 Claims, 7 Drawing Sheets

U.S. PATENT DOCUMENTS

| | | |
|---|---|---|
| 2007/0236605 A1 | 10/2007 | Saito et al. |
| 2008/0098438 A1 | 4/2008 | Unger |
| 2008/0151116 A1 | 6/2008 | Wang et al. |
| 2009/0074040 A1 | 3/2009 | Lida et al. |

FOREIGN PATENT DOCUMENTS

| | | |
|---|---|---|
| JP | 2007104138 A | 4/2007 |
| KR | 100494572 B1 | 6/2005 |
| KR | 100765797 B1 | 10/2007 |
| WO | WO-03103223 | 12/2003 |

OTHER PUBLICATIONS

International Search Report and Written Opinion of the International Searching Authority from PCT2008080057 mailed Mar. 26, 2009.

Non Final Office Action from U.S. Appl. No. 11/875,792 mailed Sep. 21, 2009.

Non-Final Office Action from U.S. Appl. No. 11/875,792 mailed Apr. 1, 2010.

Notice of Allowance from U.S. Appl. No. 11/875,792 mailed Aug. 19, 2010.

Agnihotri, U.S. Appl. No. 11/875,792, filed Oct. 19, 2007.

| CEC Address | Transfer Rate |
|---|---|
| 0.0.0.0 | 115 kbps |
| 2.1.0.0 | 400 bps |
| 2.2.0.0 | 56 kbps |
| 2.3.0.0 | 33 kbps |

Transfer Rate Table as seen by the A/V Receiver with CEC Address 2.0.0.0

CONSUMER ELECTRONICS CONTROL (CEC) LINE ENHANCEMENT METHOD FOR HDMI NETWORK THAT SELECTS A TRANSFER RATE FROM A PLURALITY OF TRANSFER RATES

This application is a continuation of U.S. application Ser. No. 11/875,792, filed Oct. 19, 2007, for Agnihotri et al., entitled CONSUMER ELECTRONICS CONTROL (CEC) LINE ENHANCEMENT METHOD FOR HDMI NETWORK THAT SELECTS A TRANSFER RATE FROM A PLURALITY OF TRANSFER RATES, which is incorporated in its entirety herein by reference.

BACKGROUND OF THE INVENTION

1. Field of the Invention

The present invention relates generally to High Definition Multimedia Interface (HDMI), and more specifically to Consumer Electronics Control (CEC).

2. Discussion of the Related Art

The High Definition Multimedia Interface (HDMI) is an all digital audio/video interface which has become a modern replacement for previous standards such as Video Graphics Array (VGA), Separate Video (S-Video), composite video, and Digital Visual Interface (DVI). HDMI allows a variety of electronics to be linked together as a network to create a home theater system for a user. These electronics may be devices such as a DVD player, television, audio/video receiver, or a video game console. The HDMI standard utilizes a Consumer Electronics Control (CEC) protocol to provide high-level control functions between devices in an HDMI network. The CEC protocol was first utilized to pass remote control data between television sets and attached devices, such as DVD players. For an HDMI network consisting of a television and DVD player, utilizing CEC, the user could insert a DVD into the DVD player and it would start playing as well as turn the TV on and switch to the DVD input.

The CEC protocol is based on the European AV link protocol and communicates data on a single wire bi-directional bus known as the CEC line. The transfer rate chosen for the CEC line in an HDMI network has been calculated to account for a fully populated network. As such, a standard transfer rate of about 400 bits/sec was selected to take into account the multiple collisions, interferences, and repeaters which occur in an HDMI network. A single transfer rate of 400 bps was selected in order to create compatibility between the various devices in an HDMI network for exchanging messages as prescribed in detain in "HDMI Specification 1.0, Supplement 1: Consumer Electronics Control (CEC)." If a user were to transfer information other than what is outlined in the HDMI specification, a secondary bus would need to be implemented to carry the additional information.

SUMMARY OF THE INVENTION

Several embodiments of the invention provide a method for determining transfer rate comprising selecting a first transfer rate of a plurality of transfer rates, transmitting a message at the first transfer rate over a Consumer Electronics Control (CEC) line of a High Definition Multimedia Interface (HDMI) network, determining whether an acknowledgment to the message having been transmitted at the first transfer rate is received, storing, in the event the acknowledgment to the message having been transmitted at the first transfer rate is received, the first transfer rate and storing, in the event no acknowledgment is received, a default transfer rate of the plurality of transfer rates.

In another embodiment, the invention can be characterized as a method further comprising, before said storing, in the event no acknowledgment is received, a default transfer rate of the plurality of transfer rates, selecting in the event the acknowledgment to the message having been transmitted at the first transfer rate is not received, a second transfer rate of the plurality of transfer rates, transmitting a message at the second transfer rate over the CEC line of the HDMI network, determining whether the acknowledgment to the message having been transmitted at the second transfer rate is received and storing, in the event the acknowledgment to the message having been transmitted at the second transfer rate is received, the second transfer rate.

In another embodiment, the invention can be further characterized as a method further comprising, before said storing, in the event no acknowledgment is received, a default transfer rate of the plurality of transfer rates, selecting in the event the acknowledgment to the message having been transmitted at the first transfer rate is not received, the default transfer rate of the plurality of transfer rates, transmitting a message at the default transfer rate over the CEC line of the HDMI network, determining whether the acknowledgment to the message having been transmitted at the default transfer rate is received and storing, in the event the acknowledgment to the message having been transmitted at the default transfer rate is received, the default transfer rate.

In a further embodiment, the invention may be characterized as a method for transferring communication comprising receiving a communication at a first transfer rate and transmitting the communication at a second transfer rate, wherein the first transfer rate is different from the second transfer rate and the communication is transferred over a single network.

In yet another embodiment, the invention may be characterized as a method of transferring communication comprising determining a destination for a communication, selecting a determined transfer rate for the destination and forwarding the communication to the destination at the determined transfer rate over a Consumer Electronics Control (CEC) line of a High Definition Multimedia Interface (HDMI) network.

In another embodiment, the invention may be characterized as a device for determining a transfer rate comprising a processor unit configured to execute functions for determining the transfer rate to a destination, a selection unit coupled to the processor unit, the selection unit configured to select any one transfer rate of a plurality of transfer rates, a communication unit coupled to the selection unit, the communication unit is adapted to transfer information at any one transfer rate of the plurality of transfer rates over a Consumer Electronics Control (CEC) line of a High Definition Multimedia Interface (HDMI) network, a determination unit coupled to the communication unit, the determination unit is configured to discover a determined transfer rate of the destination, and a data storing structure coupled to the determination unit, the storing unit is configured to store the determined transfer rate of the destination.

BRIEF DESCRIPTION OF THE DRAWINGS

The above and other aspects, features and advantages of several embodiments of the present invention will be more apparent from the following more particular description thereof, presented in conjunction with the following drawings.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Figure 1:
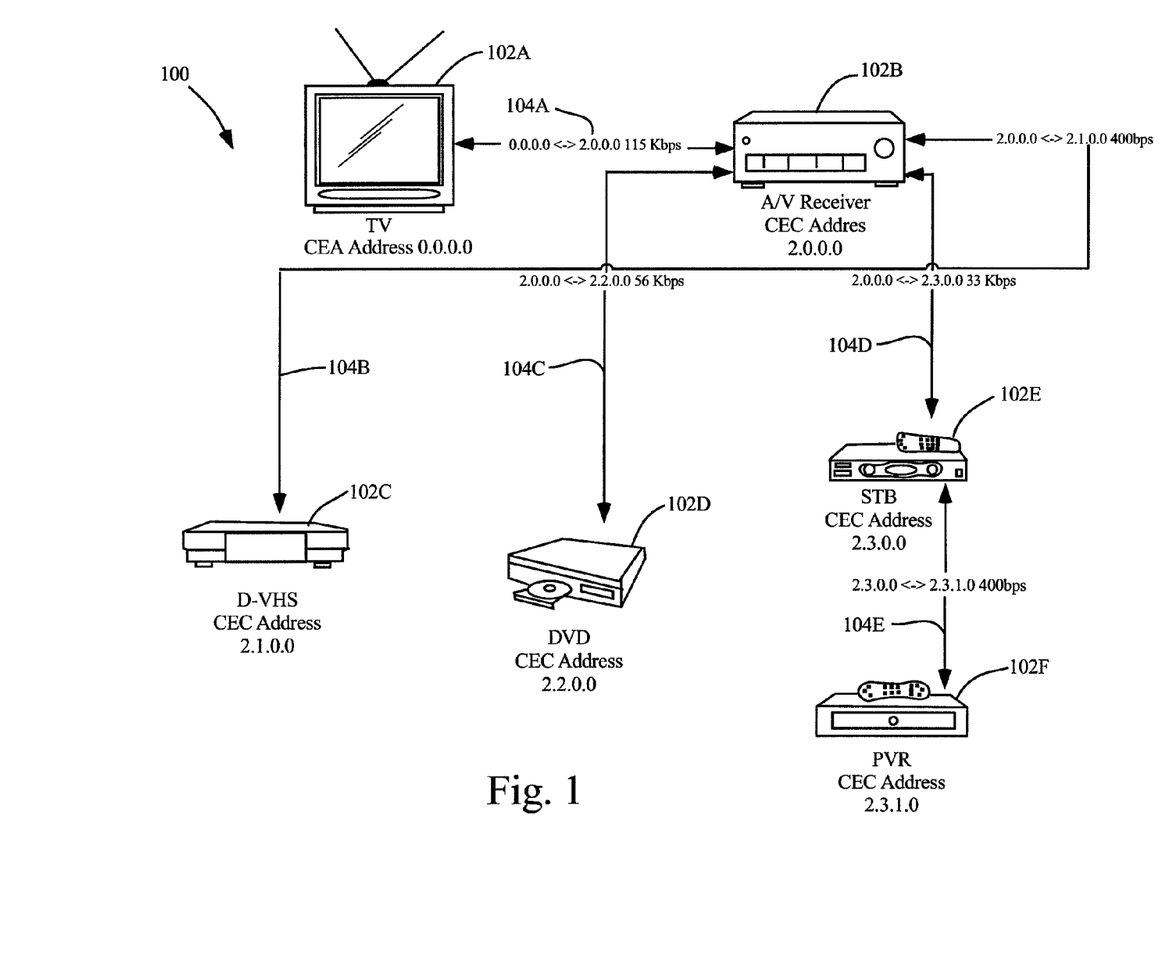
FIG. 1 is a system diagram of a CEC network with variable speed communication over an HDMI network.

Referring first to FIG. 1, a CEC network with variable speed communication is shown comprising of a television (TV) 102A, audio/video (A/V) receiver 102B, digital-video home system (D-VHS) player 102C, digital video disk (DVD) player 102D, set top box (STB) 102E, personal video recorder (PVR) 102F and CEC lines 104A-E.

The TV 102A is coupled to the A/V receiver 102B through CEC line 104A. In turn the A/V receiver is coupled to the D-VHS player 102C through CEC line 104B, the DVD player 102D through CEC line 104C, and the STB 102E through CEC line 104D. The STB 102E is coupled to the PVR 102F through CEC line 104E. For the CEC network, the TV 102A, A/V receiver 102B, D-VHS player 102C, DVD player 102D, STB 102E, and PVR 102F are HDMI compatible devices which couple together with an HDMI cable. It may be noted that the HDMI standard devotes a one wire bidirectional serial bus of the HDMI cable to the CEC line 104A-E.

With today's current standard, communications over the CEC line is transmitted at a single transfer rate, roughly 400 bps, to account for collisions and interferences between various devices in a fully populated HDMI network. Originally, the CEC line was designed to communicate remote control information between devices of a home theatre system, such as on/off or play messages and the standard transfer rate of 400 bps was chosen to ensure compatibility between devices. Today's CEC standard allows features such as one touch play, system standby, and timer programming. Yet there are no physical limitations of the HDMI interface which restricts the CEC transfer rate to a single transfer rate of 400 bps. In addition, at any given time the HDMI network may be less populated than what has been taken into account in determining the standard transfer rate. If two HDMI devices can determine the optimum transfer rate between them, communications may be enhanced beyond the preexisting standard features. FIG. 1 exemplifies a CEC network where HDMI device have implemented variable speed communication.

The HDMI network is comprised of a combination of sinks, sources and switches. The TV 102A is an example of an HDMI sink with FIG. 1 as an example topology of a HDMI network. An HDMI sink is a device with an HDMI input which receives audio/video signals. The HDMI source is a device with an HDMI output that generates an audio/video signal. Devices such as the D-VHS player 102C and DVD player 102D are examples of an HDMI source. An HDMI switch has both HDMI input and output and may simultaneously act as a sink or source. In general, the HDMI switch may communicate with one device, whether the device is a sink or source, at any given time in the network. The A/V receiver 102B is an example of an HDMI switch. As seen in FIG. 1, the A/V receiver 102B is coupled to multiple devices yet communicates with one source at any given time. Each device in the HDMI network is allocated a physical address, also referred to as a CEC address, of the form A.B.C.D. For example, the A/V receiver 102B has been allocated a physical address of 2.0.0.0. In addition, HDMI devices with CEC capability have a logical address which is allocated based on device type. Therefore the type of HDMI device may be identified by its logical address.

As shown in FIG. 1, the various HDMI devices 102A-F have already negotiated the optimal transfer rate between them. For example, the A/V receiver 102B communicates with the TV 102A over CEC line 104A at a transfer rate of 115 kbps. The A/V receiver 102B may also communicate with the D-VHS player 102C, DVD player 102D, and STB 102E over their own CEC lines (104B-D) at the transfer rates 400 bps, 56 kbps, and 33 kbps respectively. In turn, the STB 102E may communicate with the PVR 102F over CEC line 104E at a transfer rate of 400 bps. It may be appreciated that these are examples of determined transfer rates and the determined transfer rates may change depending on which HDMI devices are communicating with each other and their relative position within the CEC network. By allowing the devices to determine the optimal transfer rate, larges files providing enhanced content may be communicated between devices. Since the HDMI devices 102A-F are exchanging information at variable rates, a buffering mechanism should be implemented.

Figure 1A:
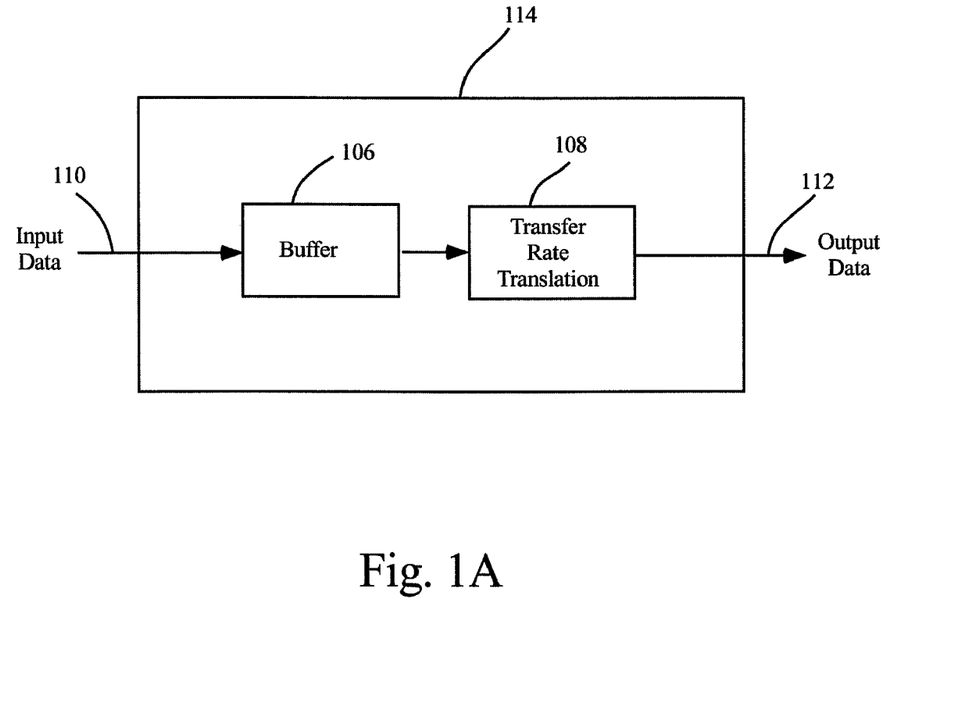
FIG. 1A is a functional block diagram of buffering capabilities of an HDMI device such as may be employed in the HDMI network of FIG. 1.

Referring next to FIG. 1A, a functional block diagram is shown of the buffering capabilities of an HDMI device which implements variable speed communication comprising an HDMI device 114, a buffer 106, transfer rate translation 108, input wire 110, and output wire 112.

The buffer 106 is within the HDMI device 114 and is coupled to the transfer rate translator 108. An input wire 110 couples with the buffer 106 while the transfer rate translator 108 couples with the output wire 112. The input and output wire 110 and 112 couple to the CEC lines associated with an HDMI device 114.

Messages conveyed over the CEC line are typically sent over a single frame. In the event the input and output transfer rate of an HDMI device 114 are different transfer rates, the message passes through the buffer 106 and the transfer rate translator 108. Signaling corresponding to data at a certain transfer rate is carried to the buffer 106 through input wire 110. The buffer 106 stores the data until the entire frame is received by the HDMI device 114. Once the entire frame has been acquired, the data is sent to the transfer rate translator 108. The transfer rate translator 108 determines the correct transfer rate to transmit the data and then outputs the data through the output line 112 at the determined transfer speed to another HDMI device. Depending on the determined transfer speed, the transfer rate translator 108 may increase or decrease the rate of transfer of the data. In essence, the transfer rate translator 108 determines the destination of the frame, selects the determined transfer rate for the destination from a data storage structure 612, and alters the transfer rate of the message to the determined transfer rate of the destination. In another embodiment of the present invention, the HDMI device 114 implements dynamic management of transfer rate. When the input transfer rate is much greater than the determined output transfer rate, the HDMI device 114 will decrease the input transfer rate to prevent buffer overflow.

For example, the AN receiver 102B of FIG. 1 is an HDMI device that has negotiated the optimal transfer rate with its neighboring devices. Information may be transferred from the TV 102A to the D-VHS player 102C through the AN receiver 102B. The A/V receiver 102B implements the buffer-translator mechanism to transmit communications between any two HDMI devices it is coupled with. Signaling corresponding to data from the TV 102A intended for the D-VHS player 102C is transferred to the AN receiver 102B through CEC line 104A at a rate of 115 kbps. The AN receiver then passes the data to the buffer 106 where the data is stored until an entire frame has been received. The transfer rate translator 108 determines that the data is intended for the D-VHS player, selects the determined transfer rate of the D-VHS player (400 bps) and transmits the data at a rate of 400 bps to the D-VHS player 102C through CEC line 104B. Signaling corresponding to information is received at an HDMI device at one transfer speed and then outputted to another HDMI device at a different transfer speed must pass through the buffer-translator mechanism of FIG. 1A.

The HDMI devices 102A-F of FIG. 1 have implemented a protocol for determining the optimum transfer rate between neighboring devices. The optimum transfer rate protocol is typically implemented along with the discovery protocol of HDMI devices, but it may be understood that the optimum transfer rate protocol may be implemented at any time. When an HDMI device is first introduced to the CEC network, the device implements a discovery protocol to announce its presence on the network and to receive a physical and logical address provisioned within the network. The discovery protocol allows an HDMI device to discover its position within the network and the device's neighbors. Once the discovery protocol has completed, the HDMI device implements the optimum transfer rate protocol as outlined in FIG. 2.

Figure 2:
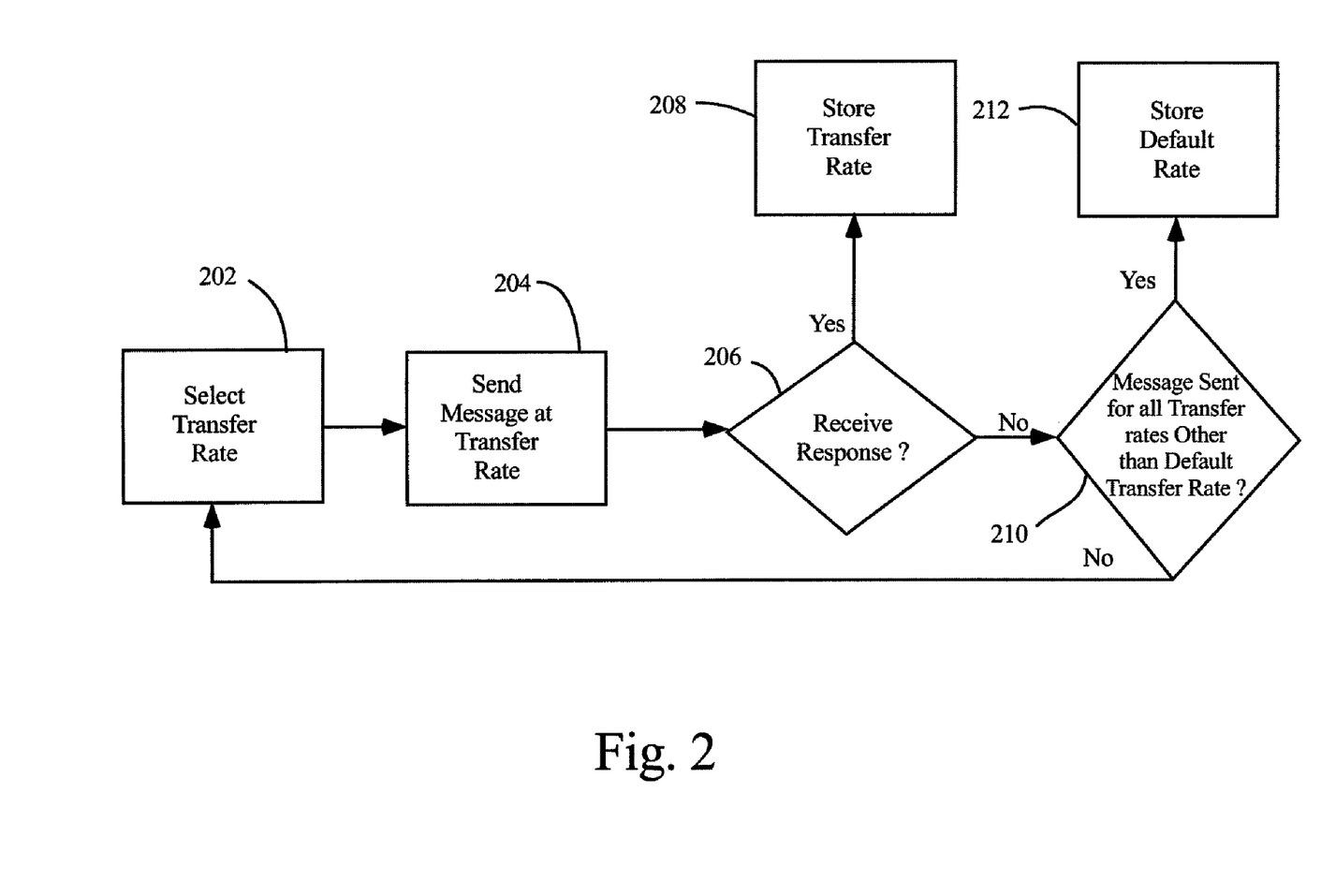
FIG. 2 is a flow diagram of the steps taken by the HDMI device, such as may be employed in the HDMI network of FIG. 1, to determine the optimum transfer rate to a destination.

Referring next to FIG. 2, a flow diagram of the steps taken by an HDMI device to determine the optimum transfer rate to a destination is shown comprising the steps of selecting a transfer rate 202, send a message at the selected transfer rate 204, determining if a response was received 206, storing the transfer rate 208, determining if the message was sent at all transfer rates other than the default transfer rate 210, and storing the default transfer rate 212.

The process for negotiating the transfer rate to a destination begins at step 202 with selecting a transfer rate, the next step is to send a message at the transfer rate 204 followed by determining if a response was received at step 206. If a response was received at step 206, the process ends at storing the selected transfer rate in step 208. If a response was not received at step 206, the process continues at step 210 where the HDMI device determines if a message was sent for all transfer rates other than the default transfer rate. If the HDMI determines that a message was sent at all transfer rates, then the process ends at storing the default transfer rate in step 212. Otherwise, the process repeats to step 202 and the HDMI device selects another transfer rate.

At step 202, the HDMI device selects a transfer rate from a predetermined list of transfer rates. This predetermined list of transfer rates is comprised of the potential transfer rates that may be used by a CEC network. Referring back to FIG. 1, a few potential transfer rates over the CEC line could be 115 kbps, 56 kbps, 33 kbps, and 400 bps. The potential transfer rates range from 115 kbps at the max and 400 bps at the min. Although, it is understood that any number of transfer rates may be chosen as part of the list of potential transfer rates and is not limited to the transfer rates depicted in FIG. 1. The list of potential transfer rates may be stored in the memory of the HDMI device. As the optimal transfer rate protocol is initiated, the potential transfer rates are selected from the predetermined list. In one embodiment, the optimal transfer rate to a destination is the highest bit rate and the potential transfer rates are selected from the predetermined list in the order of fastest (115 kbps) to the slowest (400 bps) transfer rate in a fallback procedure. In another embodiment of the present invention, algorithm optimization allows the HDMI device to select the last known transfer rate to a destination, which may be stored in the transfer rate of FIG. 3, since the HDMI standard supports hot swapping. For example, in the event that the HDMI device goes offline then later comes back online and acquires the same physical address, the HDMI device may first select the last known transfer rate to the destination.

Once the HDMI device selects a transfer rate, a message is sent to a destination at the transfer rate in step 204. In one embodiment of the present invention, the message may be a hello event, but in general the message adheres to the frame structure of the CEC protocol. The HDMI device then determines if a response or acknowledgment to the message has been received at step 206. In one embodiment of the present invention, the response may be in the form of an acknowledgment to the hello event. At step 206, the HDMI device may resend the message a given number of times until a specified period of time elapses before moving onto step 208.

If a response to the message has been received within a specified period of time, the HDMI device determines which destination returned the response. The transfer rate in which the response was sent is then stored along with the destination within a data storage structure 612 which would correlate the transfer rate with the destination in step 208. In one embodiment, the data storage structure 612 may be viewed as a transfer rate table 300 and the transfer rate would be stored in the position within the table corresponding to the destination. By storing the determined transfer rate with the destination, the HDMI device may resume communications with the destination (another HDMI device) at the determined transfer rate.

If a response to the message has not been received after a specified period of time, the HDMI device determines if a message was sent at all the possible transfer rates of the CEC network other than the default rate in step 210. In one embodiment, the default rate is the slowest rate of the CEC network which is the current standard rate of 400 bps. If the HDMI device determines that a message was sent at all the possible transfer rates of the HDMI network to the destination, the HDMI device then stores the default transfer rate along with the destination in a position within the data storage structure 612 which associates the transfer rate with the destination.

Otherwise, the HDMI device repeats the process at step 202 and selects another transfer rate from the possible transfer rates of the CEC network until a transfer rate is stored for the destination. As mentioned above, it is preferable to select the transfer rates from fastest to slowest but it is not limited to this.

In an alternative embodiment, the HDMI device still transfers a message at the default rate to a destination and waits to receive a response from the destination. Since current HDMI devices are already configured to communicate at the default rate of 400 bps, a response would be expected at the default rate. A failure to receive a response at the default rate would indicate an error in communication.

In one embodiment of the present invention, the HDMI device determines the optimal transfer rate to its neighbors by individually querying each neighbor until a transfer rate has been determined for each neighbor. The HDMI device implements the process of FIG. 2 until a transfer rate is determined and stored for one neighbor before implementing the same process for another neighbor. The individual querying continues until a transfer rate is determined for each neighbor and stored in the data storing structure 612.

In another embodiment of the invention, the HDMI device may broadcast a message at the fastest transfer rate and then store the fastest transfer rate for each neighbor which has returned an acknowledgment to the message. The HDMI device will then broadcast a message at each subsequent transfer rate until the device has determined the transfer rate for all neighbors.

In a further embodiment of the invention, the HDMI device determines the optimal transfer rate of its neighbors by collectively querying each neighbor until a transfer rate has been determined for each neighbor. The HDMI device implements the process of FIG. 2 by selecting a transfer rate and sending a message to a neighbor and determines whether the transfer rate should be stored. Yet the process does not repeat and select a new transfer rate for any neighbor until each neighbor coupled to the HDMI device has applied the process of FIG. 2 for the selected transfer rate. The collective querying ends once a determined transfer rate is stored for each neighbor in the data storing structure 612. The determined transfer rates for each neighbor to an HDMI device is stored in a data storing structure 612. This structure may implement storing in a variety of different ways, but the data storing structure 612 may be exemplified as a transfer rate table as depicted in FIG. 3.

Figure 3:
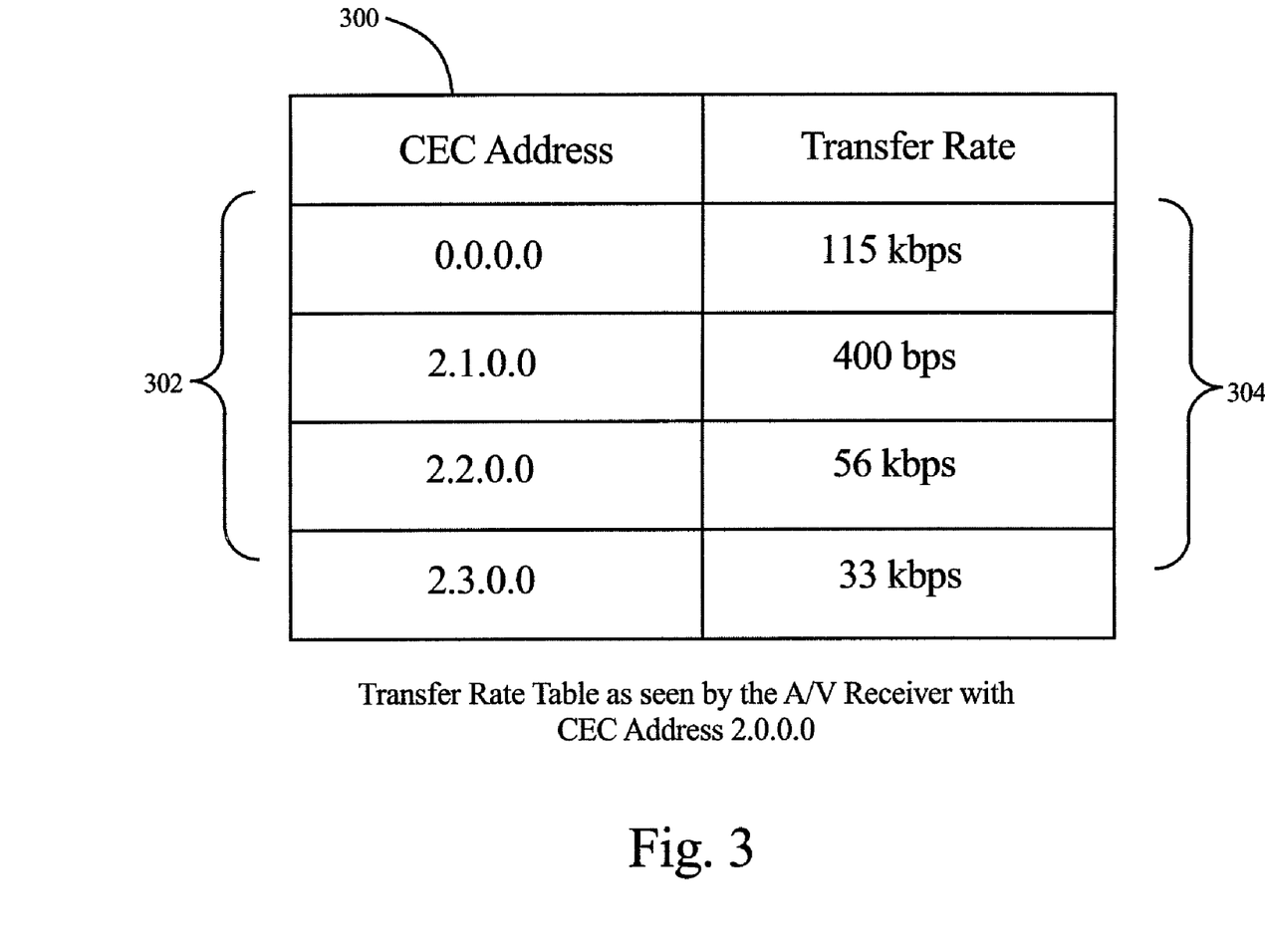
FIG. 3 is an example of a transfer rate table as viewed by the HDMI device such as may be employed in the flow diagram of FIG. 2.

Referring next to FIG. 3, an example of a transfer rate table 300 as viewed by an HDMI device is depicted comprising a plurality of CEC address slots 302 and a plurality of transfer rate slots 304.

The CEC address slots 302 stores the CEC address of each HDMI device neighbor. Each CEC address slot 302 has a corresponding transfer rate slot 304 where the determined transfer rate for the device corresponding to the CEC address is stored. The transfer rate table 300 embodies the data storing structure 612 which the HDMI device will access for the determined transfer rates of its neighbors. The transfer rates stored in the transfer rate table 300 in the designated transfer rate slots 304 allows an HDMI device to recognize at what rate information may be transferred to another HDMI device. These stored transfer rates are used by the transfer rate translator 108 to convert the rate of transfer of a frame.

The transfer rate table 300 is seen from the viewpoint of the A/V receiver 102B. The A/V receiver 102B has a CEC address of 2.0.0.0 and is coupled to the TV 102A (CEC address: 0.0.0.0), D-VHS player 102C (CEC address: 2.1.0.0), DVD player 102D (CEC address 2.2.0.0), and STB 102E (CEC address 2.3.0.0). The CEC addresses of the TV 102A, D-VHS player 102C, DVD player 102D, and STB 102E are stored in the CEC address slots 302 of the transfer rate table 300 corresponding to the A/V receiver 102B. The corresponding determined transfer rates to these devices are stored in the transfer rate slots 304. As seen in FIG. 1, the transfer rate between the A/V receiver 102B and the TV 102A is 115 kbps, this transfer rate is stored in the transfer rate slot 304 corresponding to the CEC address 0.0.0.0 in FIG. 3. Each HDMI device 102A-F has its own unique transfer rate table. For the CEC network depicted in FIG. 1, the transfer rate table of the TV 102A would have one entry corresponding to the A/V receiver and its respective transfer rate 115 kbps.

For example, signaling corresponding to a message between the DVD player 102D and the TV 102A passes through the A/V receiver 102B. The A/V receiver 102B receives the message and passes the message to the buffer 106 at a speed of 56 kbps from the DVD player 102D and determines that the message should be forwarded to the TV 102A. Next, the A/V receiver 102B then utilizes the transfer rate table 300 and "looks up" the determined transfer rate of the TV 102A by the respective CEC address (0.0.0.0) and corresponding transfer rate entry (115 kbps). Finally, the transfer rate translator 108 sends the message to the TV 102A at the transfer rate of 115 kbps.

The CEC network 100 of FIG. 1 depicts a network where the variable speed communication between HDMI devices 102A-F is symmetric. In other words, the A/V receiver 102B transfers and receives data to and from its neighboring HDMI devices 102A, 102C-E at the same rate over their respective CEC lines 104A-D. The CEC network 100 may also implement asymmetric variable speed communication. An HDMI device on the CEC network may transfer data to another device at one rate, but receive data from that device at another rate.

Variable speed communication in a CEC network provides many advantages to modern home entertainment systems. The higher data rates would allow a user to implement enhanced features without the device needing to implement a second bus to carry additional information other than the current CEC features. With higher transfer rates, enhanced content such as a movie poster or an album cover may be communicated between HDMI devices and create a richer viewing experience for the user. It should be appreciated that the enhanced content may include any content or data which requires higher transmission rates than the CEC standard is currently implementing. In one embodiment of the present invention, the enhanced content provides the user with a menu for content based selection of media.

Figure 4:
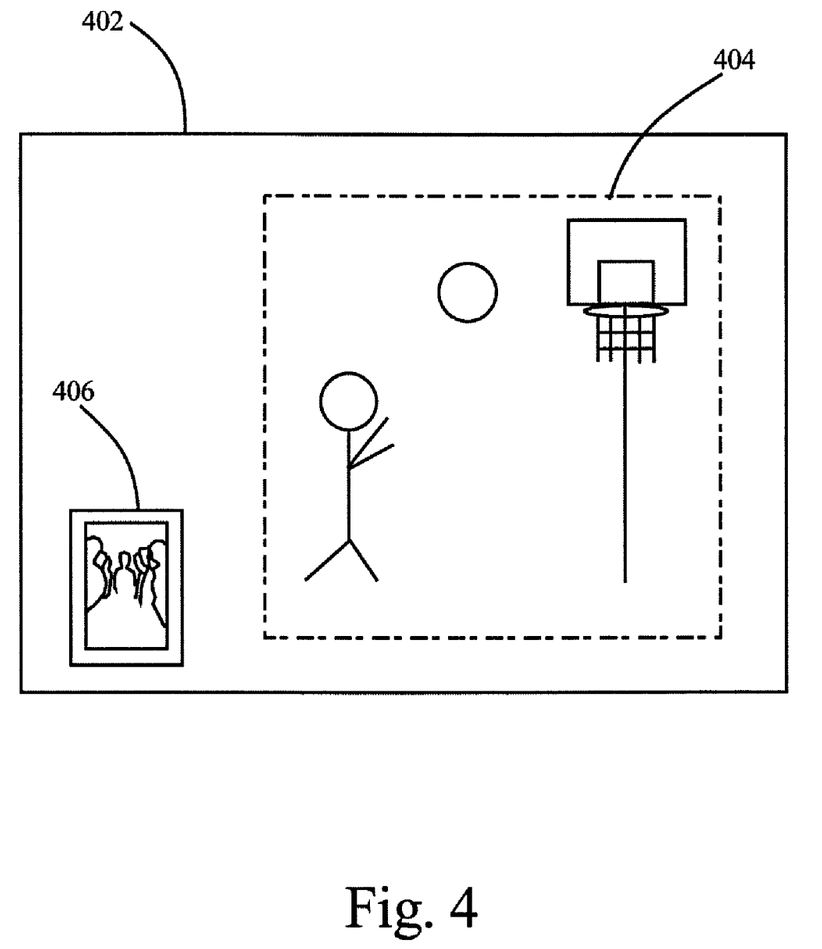
FIG. 4 is a schematic diagram of a display screen of an HDMI device such as may be employed in the HDMI network of FIG. 1, with enhanced content.

An example of an application which utilizes variable speed communication to transfer enhanced content is depicted in FIG. 4. Referring to FIG. 4, a schematic diagram of a display screen is shown comprising of a display screen 402, image content 404 and thumbnail 406.

The image content 404 and thumbnail 406 are exhibited on the display screen 402. FIG. 4 illustrates the display screen 402 is a part of the TV 102A, but it may be appreciated that the display screen 402 may be a part of any HDMI sink that is configured to receive and display audio/video signals.

By implementing variable speed communication, the TV 102A may provide a richer viewing experience to a user by preloading enhanced content from other HDMI devices. Enhanced content is transferred to the TV 102A and displayed onto the display screen 402 as a thumbnail 406. The thumbnail operates as an enhanced link which allows a user to view and access the possible media choices provided by other HDMI devices. As a user is viewing image content 404 on the display screen 402, a DVD is set onto the DVD carousel of DVD player 102D. Signaling corresponding to enhanced content is sent from the DVD player 102D to the TV 102A through CEC lines 104C, 104A. The TV 102A receives the enhanced content and utilizes the enhanced content through a thumbnail 406 on the display screen 402. For FIG. 4, the enhanced content is an image of a movie poster ("Harry Potter") which alerts the user that the movie "Harry Potter" is available for viewing by another device on the HDMI network. The enhanced content is not restricted to movie posters, but may also be images of album art, DVD covers, iconic representations of HDMI devices within the network, or any other content data. In another embodiment, a CD may be placed into a CD player connected to the HDMI network. The CD player provides signaling corresponding to enhanced content such as album artwork to the TV 102A. The TV 102A then utilizes the album artwork as a thumbnail 406 on the display screen 402.

When a user selects the thumbnail 406, control signaling is sent across the various CEC lines to switch which HDMI device is transmitting audio/video signals to the TV 102A. For example, the user may be originally viewing image content 404 provided by the set top box 102E, but then selects the thumbnail 406, disposed on the display screen 402, corresponding to the movie "Harry Potter" provided by the DVD player 102D. Control signaling is then sent through CEC lines 104A, 104D indicating the set top box 102E to halt transmission of the image content 404 while additional control signaling is sent through CEC lines 104A, 104C indicating the DVD player 102D to transmit audio/video signals of the movie "Harry Potter."

Figure 5:
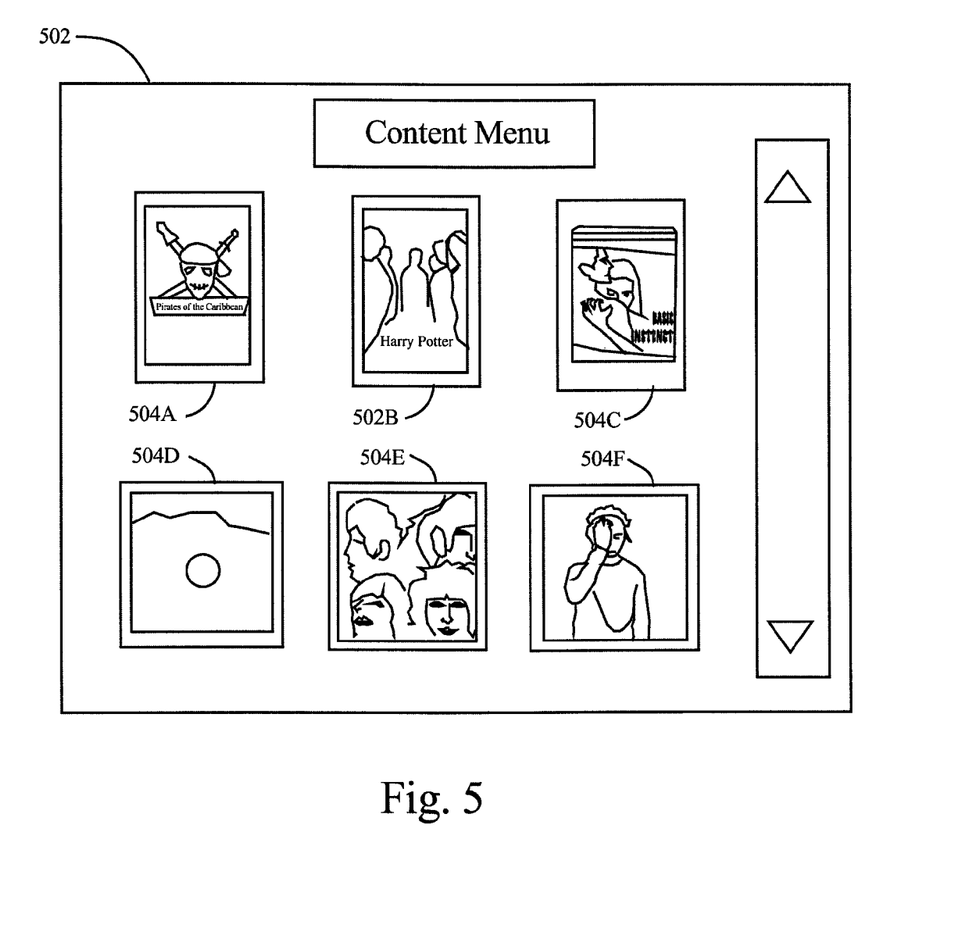
FIG. 5 is a schematic diagram of a menu which may be disposed on the display screen of FIG. 4, with enhanced content.

Another example of an application which utilizes variable speed communication to transfer enhanced content is depicted in FIG. 5. Referring to FIG. 5, a schematic diagram of a menu is shown comprising a content menu 502 and thumbnail icons 504A-F.

The thumbnail icons 504A-F are disposed within the content menu 502. The content menu is displayed on a display screen 402 of an HDMI sink which receives and displays audio/video signals such as the TV 102A. The content menu 502 is accessed by a user through a command button on a remote control. Alternatively, the menu may also be accessed by a command button on the HDMI device itself. The HDMI device queries other HDMI devices on the network through the CEC line for access to any possible enhanced content provided by the other HDMI devices. The enhanced content may be images representative of the media within the HDMI devices, such as DVD covers or movie posters corresponding to DVDs in a DVD player 102D, album covers of audio from a CD player or portable media player (such as an iPod), or TV images from a set top box 102E. Signaling corresponding to the enhanced content is passed to the HDMI sink through its CEC line. The HDMI sink collects the enhanced content and displays the content on the display screen 402 in a content menu 502 as thumbnail icons 504A-F.

The thumbnail icons 504A-F operates as a plurality of enhanced content which allows a user to browse available media of an HDMI network by content. A user may peruse the content menu 502 to see what media was available over the HDMI network, such as movies, music, and television shows. By selecting one of the thumbnail icons 504A-F, control signaling is sent across the CEC line to switch output to the HDMI device that is transmitting audio/video signals to the HDMI sink for a user to view.

For example, the content menu 502 may be viewed on the display screen 402 of the television 102A. The thumbnail icons 504A-C correspond to movies (504A-C) and music (504D-F) which the television 102A may receive from other HDMI devices over the network such as the DVD player 102D or a CD player (not shown). Signaling corresponding to the images of movies and music are received by the TV 102A through the CEC line 104A. In turn, the TV 102A displays the images as thumbnail icons 504A-F. When a user selects one of the thumbnail icons 504A-F, control signaling is sent across the various CEC lines to switch which HDMI device is transmitting audio/video signals to the TV 102A. For example, the user may be originally viewing television content provided by the set top box 102E but selects thumbnail icon 504C corresponding to the movie "Basic Instinct" which is provided by the DVD player 102D. Control signaling is then sent through CEC lines 104A, 104D indicating for the set top box 102E to halt transmission of the television content while additional control signaling is sent through CEC lines 104A, 104C indicating for the DVD player 102D to provide audio/video signal of the movie "Basic Instinct." Since enhanced content may be shared through the CEC network with variable speed communication, a user may chose the media based on content.

Figure 6:
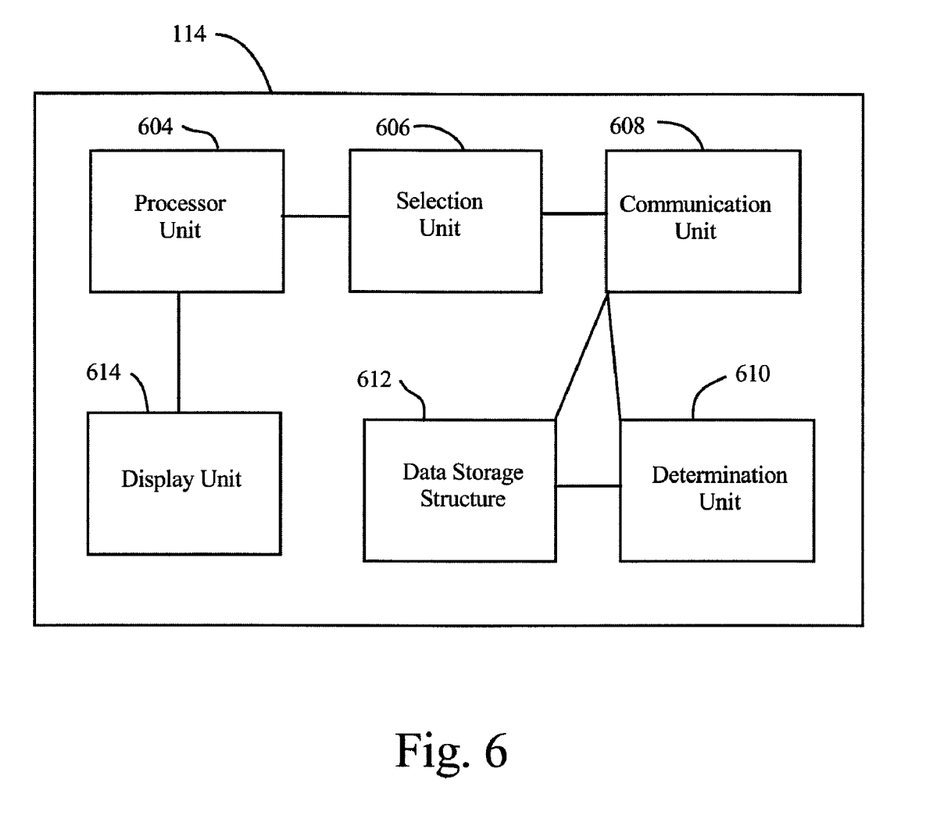
FIG. 6 is a structural block diagram of the HDMI device, such as may be employed in the HDMI network of FIG. 1, with variable speed communication over the CEC line.

Referring next to FIG. 6, a structural block diagram is shown of HDMI device 114 with variable speed communication over the CEC line comprising a processor unit 604, selection unit 606, communication unit 608, determination unit 610, data storage structure 612. The HDMI device 114 may also optionally include a display unit 614.

The processor unit 604 is coupled to the selection unit 606 which is in turn coupled to the communication unit 608. The communication unit 608 is coupled to the determination unit 610, and the data storage structure 612. When the HDMI device 114 includes a display unit 614, the processor unit 604 is coupled to the display unit 614.

The processor unit 604 is comprised of circuitry to execute the optimum transfer rate protocol of FIG. 2. Control signals from the processor unit 604 are transferred to the various units 606, 608, 610, and 612 to perform steps 202-212 shown in FIG. 2. A plurality of potential transfer rates of the CEC network is stored within the memory of the HDMI device 114 which is accessed by the selection unit 606. The selection unit begins step 202 of the process depicted in FIG. 2 by selecting one transfer rate from the plurality of potential transfer rates of the CEC network. In a preferred embodiment, the first transfer rate chosen from the plurality of potential transfer rates is the fastest rate of transfer, approximately 115 kbps, of the CEC network and any subsequent selection from the plurality of transfer rates are chosen from the next fastest to slowest transfer rate.

A message is transmitted by the communication unit 608 at the transfer rate selected by the selection unit 606. The communication unit 608 is comprised of transmitter and receiver circuitry configured for communicating over the CEC line of an HDMI network which allows data to be transmitted to and from the HDMI device 114 at any of the potential transfer rates of the CEC network. During the process of determining the optimum transfer rate to another HDMI device, the communication unit waits a specified period of time to receive a response to the message in step 206. If a response to the message has not been received after the given period of time, the determination unit 610 performs step 210 and verifies whether the HDMI device 114 has attempted to transmit a message at all the possible transfer rates of the CEC network.

In addition, the determination unit 610 verifies the determined transfer rate of the destination which the HDMI device 114 is attempting to establish a rate of transfer. Once a response is received in step 206, the determination unit 610 finds the transfer rate which the message was sent and forwards an indication of the determined transfer rate along with an indication of the destination to the data storage structure 612. At step 210 of FIG. 2, the determination unit 610 establishes the default transfer rate as the determined transfer rate to a destination once the determination unit 610 has verified that a message has been communicated at all the other possible transfer rates of the CEC network. The determination unit 610 then forwards indications corresponding to the default transfer rate and the destination to the data storage structure 612.

The data storage structure 612 is an internal memory system configured to receive indications corresponding to a destination and the determined transfer rate of the destination. In one embodiment, the data storage structure 612 may be exemplified as a transfer rate look-up table 300 of FIG. 3 which stores the determined transfer rates and the addresses of the direct neighbors of the HDMI device 114. In both steps 208 and 212, the data storage structure receives the determined transfer rate from the determination unit 610. The transfer rates and destinations stored in the data storage structure will be later accessed by the determination unit 610 when data is forwarded to another HDMI device.

Once the HDMI device 114 has determined the transfer rates to every immediate neighbor over the HDMI network, the HDMI device 114 may communicate enhanced content, such as icons and pictures which require higher bandwidth transmission, over the CEC line. It should be appreciated that the enhanced content is not limited to icons and pictures and may include any content or data which requires higher transmission rates than the CEC standard is currently implementing. The variable speed communication implemented by the HDMI device 114 allows data to be transferred to the device 114 at one transfer rate and the same data may be transferred from the HDMI device 114 at another transfer rate. The buffer-translator system of FIG. 1A allows an HDMI device 114 to receive input data over the CEC line at one rate and forward the data over the CEC line at another rate. The determination unit 610, data storage structure 612, and communication unit 608 may be configured to work together as the buffer-translator system of FIG. 1A. Signaling corresponding to data is received by the communication unit 608. The determination unit 610 first determines whether the information is intended for the HDMI device 114 or whether the data must pass through the buffer-translator system to be forwarded to another HDMI device. When the determination unit 610 has determined the destination of the received data, the determination unit 610 is further configured for accessing the transfer rate table 300 stored within the data storage structure 612 and selecting the corresponding determined transfer rate of the destination. Referring to FIG. 3, if the determination unit 610 verifies that the data is intended for destination with CEC address 0.0.0.0, then the determination unit selects 115 kbps as the determined transfer rate. In the meantime, the incoming data is buffered until an entire frame of data has been received. The communication unit 608 then transmits the data to its intended destination at the corresponding determined transfer rate over the CEC line.

As previously mentioned above, an HDMI device 114 may transfer enhanced content besides the standard CEC messages by implementing variable speed communication. An example application of transferring enhanced content over the CEC line with variable speed communication may be utilizing enhanced content in the form of movie poster images or CD album images corresponding to the media provided by other HDMI devices on the network as discussed with FIGS. 4 and 5.

Optionally, an HDMI device 114, such as a television (or other HDMI sink), may include a display unit 614 which utilizes variable speed communication to transfer enhanced content. Signaling corresponding to enhanced content intended to be displayed by the HDMI device 114 with a display unit 614 is received through the communication unit 608. The enhanced content is forwarded to the processor unit 604 which process the data to be displayed on the display unit 614.

The display unit 614 is configured for displaying audio/video signals to a user. A few examples of a possible display unit 614 could be LCD, DLP, or plasma display screens. The display unit 614 receives, utilizes, and displays the enhanced content sent to the HDMI device 114. As previously mentioned in FIGS. 4 and 5, the display unit 614 (also referenced as 402) may display a thumbnail corresponding to enhanced content or a menu corresponding to a multitude of media choices provided by HDMI devices on the network. Both the thumbnail and the menu of enhanced content allow a user to view and access the possible media choices provided by other HDMI devices.

While FIG. 6 depicts the various components of the HDMI device 114 as separate entities, it may be appreciated that the components 604, 606, 608, 610, 612, and 614 may be integrated together as one unit or any combination of units. With variable speed communication, the devices on an HDMI network may provide a user with a richer viewing experience.

While the invention herein disclosed has been described by means of specific embodiments, examples and applications thereof, numerous modifications and variations could be made thereto by those skilled in the art without departing from the scope of the invention set forth in the claims.

What is claimed is:

1. A method implemented by a computing system for determining transfer rate comprising:
   selecting a first transfer rate of a plurality of transfer rates;
   transmitting a message at the first transfer rate over a Consumer Electronics Control (CEC) line of a High Definition Multimedia Interface (HDMI) network;
   determining whether an acknowledgment to the message having been transmitted at the first transfer rate is received;
   storing, in the event the acknowledgment to the message having been transmitted at the first transfer rate is received, the first transfer rate; and
   storing, in the event no acknowledgment is received, a default transfer rate of the plurality of transfer rates.

2. The method of claim 1, further comprising, before said storing, in the event no acknowledgment is received, a default transfer rate of the plurality of transfer rates:
   selecting in the event the acknowledgment to the message having been transmitted at the first transfer rate is not received, the default transfer rate of the plurality of transfer rates;
   transmitting a message at the default transfer rate over the CEC line of the HDMI network;
   determining whether the acknowledgment to the message having been transmitted at the default transfer rate is received; and
   storing, in the event the acknowledgment to the message having been transmitted at the default transfer rate is received, the default transfer rate.

3. The method of claim 1, wherein the step of storing, in the event the acknowledgment to the message having been transmitted at the first transfer rate is received, the first transfer rate, further comprises:

determining a destination which returned the acknowledgment to the message having been transmitted at the first transfer rate; and storing a first indication corresponding to the destination and a second indication corresponding to a determined transfer rate of the destination.

4. The method of claim 1, further comprising:
determining a destination for a communication;
selecting a determined transfer rate for the destination;
forwarding the communication to the destination at the determined transfer rate;
receiving the communication at a different transfer rate than the determined transfer rate; and
storing the communication.

5. The method of claim 1, further comprising:
transmitting enhanced content through the CEC line at a determined transfer rate.

6. The method of claim 1, further comprising:
receiving enhanced content through the CEC line; and
utilizing the enhanced content.

7. The method of claim 1, further comprising:
receiving a plurality of enhanced content through the CEC line; and
displaying a menu comprising of the plurality of enhanced content.

8. A device for determining a transfer rate comprising:
a processor unit configured to execute functions for determining the transfer rate to a destination;
a selection unit coupled to the processor unit, the selection unit configured to select any one transfer rate of a plurality of transfer rates
a communication unit coupled to the selection unit, the communication unit is adapted to transfer information at any one transfer rate of the plurality of transfer rates over a Consumer Electronics Control (CEC) line of a High Definition Multimedia Interface (HDMI) network;
a determination unit coupled to the communication unit, the determination unit is configured to discover a determined transfer rate of the destination; and
a data storing structure coupled to the determination unit, the data storing structure is configured to store the determined transfer rate of the destination.

9. The device of claim 8, wherein the determination unit is configured to discover the determined transfer rate from a message received at any one transfer rate of the plurality of transfer rates.

10. The device of claim 8, wherein the data storing structure further comprises:
a first indication corresponding to the destination; and
a second indication corresponding to the determined transfer rate of the destination.

11. The device of claim 8, wherein the communication unit is configured to determine the destination and the determined transfer rate for a communication and forwards the communication at the determined transfer rate of the destination; and
receive the communication at a different transfer rate than the determined transfer rate.

12. The device of claim 8, wherein the communication unit is configured to transmit enhanced content through the CEC line at the determined transfer rate.

13. The device of claim 8, further comprising:
the communication unit configured to receive enhanced content through the CEC line; and
a display unit coupled to the communication unit, the display unit configured to utilize the enhanced content.

14. The device of claim 8, further comprising:
the communication unit configured to receive a plurality of enhanced content through the CEC line; and
a display unit coupled to the communication unit, the display unit configured to display a menu comprising of the plurality of enhanced content.

* * * * *

UNITED STATES PATENT AND TRADEMARK OFFICE
CERTIFICATE OF CORRECTION

| | | |
|---|---|---|
| PATENT NO. | : 8,156,266 B2 | |
| APPLICATION NO. | : 12/889269 | |
| DATED | : April 10, 2012 | |
| INVENTOR(S) | : Agnihotri et al. | |

It is certified that error appears in the above-identified patent and that said Letters Patent is hereby corrected as shown below:

Claim 18, column 13, line 31, after "rates" insert --;--.

Signed and Sealed this
Thirty-first Day of July, 2012

David J. Kappos
*Director of the United States Patent and Trademark Office*